United States Patent
Blasco Claret et al.

(10) Patent No.: US 7,391,714 B2
(45) Date of Patent: Jun. 24, 2008

(54) POINT TO MULTIPOINT SYSTEM AND PROCESS FOR THE TRANSMISSION OVER THE ELECTRICITY NETWORK OF DIGITAL DATA

(75) Inventors: Jorge Vicente Blasco Claret, Valencia (ES); Juan Carlos Riveiro Insua, Valencia (ES); Nils Hakan Fouren, Barcelona (ES); Carlos Pardo Vidal, Valencia (ES); Juan Miguel Gavillero Martin, Burjasot (ES); Jose Luis Gonzalez Moreno, Xirivella (ES); Francisco Javier Jimenez Marquina, Valencia (ES); Francisco José Andres Navarro, Valencia (ES); Victor Dominguez Richards, Torrente (ES); María Teresa Forment Tarrega, Alaquas (ES)

(73) Assignee: Diseno De Sistemas En Silicio, Valencia (ES)

( * ) Notice: Subject to any disclaimer, the term of this patent is extended or adjusted under 35 U.S.C. 154(b) by 904 days.

(21) Appl. No.: 10/464,064

(22) Filed: Jun. 17, 2003

(65) Prior Publication Data
US 2004/0037214 A1 Feb. 26, 2004

Related U.S. Application Data

(63) Continuation of application No. PCT/ES01/00490, filed on Dec. 18, 2001.

(30) Foreign Application Priority Data
Dec. 18, 2000 (ES) ................................ 200003024

(51) Int. Cl.
 H04J 11/00 (2006.01)
 H04J 3/22 (2006.01)
 G05B 11/01 (2006.01)
(52) U.S. Cl. ..................... 370/208; 370/465; 340/310.12
(58) Field of Classification Search ................. 370/203, 370/208, 209, 210, 331, 332, 335, 342; 375/299
 See application file for complete search history.

(56) References Cited

U.S. PATENT DOCUMENTS

| 5,285,474 | A | * | 2/1994 | Chow et al. .................. 375/231 |
| 5,355,114 | A | | 10/1994 | Sutterlin et al. |
| 6,005,477 | A | | 12/1999 | Deck et al. |

(Continued)

FOREIGN PATENT DOCUMENTS

CA    1 014 640 A2 *  6/2000

(Continued)

OTHER PUBLICATIONS

Armada, AG et al., OFDMA Acess Scheme for the Return Channel on Interactive Services, Global Communications Interactive "97", (1998), pp. 1-4.

*Primary Examiner*—King Y. Poon
*Assistant Examiner*—Peter L Cheng
(74) *Attorney, Agent, or Firm*—Klauber & Jackson, LLC

(57) ABSTRACT

The system enables bidirectional communication between a center and a plurality of users via a power line network and is characterized in that low and high speed communication can be established to provide multiple high-quality services to the users. The system comprises a performing network and frequency time-sharing and/or orthogonal frequency-division multiple access (OFDMA).

33 Claims, 6 Drawing Sheets

U.S. PATENT DOCUMENTS

| | | | | |
|---|---|---|---|---|
| 6,091,932 | A * | 7/2000 | Langlais | 725/111 |
| 6,144,695 | A * | 11/2000 | Helms et al. | 375/222 |
| 6,181,714 | B1 * | 1/2001 | Isaksson et al. | 370/491 |
| 6,321,075 | B1 * | 11/2001 | Butterfield | 455/313 |
| 6,396,392 | B1 * | 5/2002 | Abraham | 370/282 |
| 6,473,438 | B1 * | 10/2002 | Cioffi et al. | 370/468 |
| 6,553,063 | B1 * | 4/2003 | Lin et al. | 375/223 |
| 6,671,284 | B1 * | 12/2003 | Yonge et al. | 370/462 |
| 6,771,284 | B1 * | 8/2004 | Anderson et al. | 715/705 |
| 6,985,548 | B1 * | 1/2006 | Jabbar et al. | 375/355 |
| 7,173,979 | B1 * | 2/2007 | Badri et al. | 375/308 |
| 7,203,718 | B1 * | 4/2007 | Fu et al. | 708/622 |

FOREIGN PATENT DOCUMENTS

| | | | |
|---|---|---|---|
| CA | 1014640 | A2 * | 6/2000 |
| EP | 0 975 097 | A2 | 1/2000 |
| EP | 1 011 235 | A2 | 6/2000 |

* cited by examiner

POINT TO MULTIPOINT SYSTEM AND PROCESS FOR THE TRANSMISSION OVER THE ELECTRICITY NETWORK OF DIGITAL DATA

This application is a continuation of international application number PCT ES01/00490, filed Dec. 18, 2001.

TECHNICAL FIELD OF THE INVENTION

The present invention relates generally to the telecommunications sector, and more particularly, it is applicable to bi-directional communication between a head-end and various users when using the electricity network as the means of communication so that a variety of services can be offered through it to the users. The objective of this invention is to establish both low and high speed communications, so that multiple high quality services can be offered to the users, comprising for example, video on demand, high-speed Internet, etc. It may also be used for applications requiring larger latency such as for example VoIP (voice over IP). Furthermore, the invention may also be used for narrow band services, such as standard telephone and current telecommunication services.

BACKGROUND OF THE INVENTION

The use of the electricity network as a means of transmission is known in the background art, but due to its poor performance, its use as a data transmission network has been limited to point-to-point communication at very low speeds.

This is due, among other reasons, to the fact that, in the electricity network, the connection and disconnection of apparatus generate voltage peaks and impedance variations on the line and cause serious loss of signal that varies in function of frequency and time.

Furthermore, various obstacles impede the establishment of communication between a head-end and a plurality of users, in particular due to the many changes in impedance in different frequencies and the emergence of reflections that cause the received signal to be a combination of the transmitted signal and a series of echoes that circulate through the electricity network with different attenuations and delays for each one of the users on the received signal.

Furthermore, attenuation, noise, and channel response vary dynamically in frequency and time.

All these obstacles have to date limited the use of the electricity network for full-duplex, high-speed point to multipoint communication.

On the other hand, other means of communication for the transmission of data are known in the background art, such as the use of twisted pair in telephones to establish point to point or point to multipoint communication.

In this context we cite U.S. Pat. No. 5,673,290 wherein a method of point to point transmission is described that consists of communication via a downstream channel determined by a link from the head-end to a plurality of different users, and communication via the upstream channel determined by a link from the users to the head-end, whereby the communication is made possible using a discrete digital multi-tone (DMT) transmission system and providing the coding of the digital data and the modulation of the encoded data over the discrete multi-tone signal.

Furthermore, the communication line is supervised to determine at least one line quality parameter, including noise levels in each one, and includes a multitude of sub-channels each one corresponding to an associated sub-carrier tone. The modulation system is designed to take various factors into account including detected line quality parameters, the parameters of sub-channel gains, and a masking parameter of permissible power when modulating the discrete multi-tone signal. The modulation system is also capable of dynamically activating the sub-carriers used and the quantity of data transmitted in each sub-carrier during transmission to adapt in real time to changes in individual sub-carriers.

In applications susceptible to interference, the associated bandwidths can be simply masked or silenced to prevent interference in either direction, and therefore, the signals are transmitted by sub-carriers with frequencies above or below the most significant noise levels.

Furthermore, in this document the transmission occurs in base band and the conjugated real hermitian transformation of the transmissible information is used (real Fast Fourier Transform). Due to the characteristics already described, this transmission method cannot be applied to transmission over the electricity network.

Furthermore, the method described in the patent cited above refers to point to point communication, therefore, neither its use over the electricity network nor the possibility for full duplex point to multipoint communication can be inferred.

On the other hand, point to multipoint communication systems exist such as that described in the PCT Patent Number WO96/37062 where the transmission line can be coaxial cable, fibre optic or similar, which uses orthogonal frequency division multiple access modulation system (OFDM), a modulation system that is well known in the background art, and to which a cyclic prefix is added to each OFDM symbol to alleviate the effects of the multipath propagation as is well known in the state of the art. The use of the cyclic prefix with the OFDM modulation can be encompassed by the DMT modulation used in the previous document and equally widely used in the state of the art.

The document describes how channels are established over respective sub-carrier groups, so that each user is assigned a specific group of tones so that the hardware and the complexity involved in realizing the discrete Fourier transformation is substantially reduced, however, as a fixed system it does not allow the assignation of different sub-carriers to the users depending on the prevailing frequency and time conditions in each channel, even when, as described in the case of U.S. Pat. No. 5,673,290, the individual sub-carriers can connect or disconnect to avoid interferences.

Furthermore, it uses a remote loop to correct the frequency of local oscillators of the various user modems.

As a relevant background art we can cite Document EP-1011235-A2, which discloses an embodiment to receive multicarrier signals over power lines. It shows an Orthogonal Frequency Division Multiplexed (OFDM) power line communications system comprising a power line for distributing electricity to a plurality of premises and a communication station coupled to the power line at one of the premises, which station uses a part of the power line external to the premises as a communication medium. The communications station includes a receiver which comprises a clipping system adapted to a clip an incoming OFDM data waveform, which includes a regular impulsive noise component, so as to reduce the level of noise on the waveform.

We can also cite U.S. Pat. No. 5,815,488 and U.S. Pat. No. 5,828,660 regarding point to multipoint communication.

Neither in these documents is there a description of the adaptation for the transmission using the electricity network.

Furthermore, none of the documents cited previously concerns the transmission for multiple users, nor how to maximize the throughput of the upstream and downstream channels in the electricity network.

DESCRIPTION OF THE INVENTION

The current invention comprises a system and process for the digital transmission of data at high speeds in a point to multipoint communication over the electricity network.

To achieve this, the current invention, as is the case for other existing conventional systems, makes the communication or link between a head-end and a plurality of different users (downstream channel) and from the users to the head-end (upstream channel), the communication being achieved by means of an OFDM (orthogonal frequency division multiplexing) modulation that generates OFDM symbols to achieve a master-slave communication when both the users and the head-end contain a transmitter/receiver including a Medium Access Control (MAC) module, where, in the case of the current invention, the medium is the electricity network. Furthermore, the system of this invention includes the means of adding/extracting a cyclic prefix to the OFDM symbols and the means to convert the OFDM symbols from frequency to time and from time to frequency, and means to convert the communication from digital to analog and from analog to digital.

The invention is characterized because the transmitter/receiver for the head-end and the users includes the means of adapting the digital transmission to the electricity network, so that these allocate the OFDM modulation with a carrier width reduced to at least 1.5 KHz and with the number of carriers increased to at least 500 carriers for each 10 MHz to strengthen against selective frequency fading arising from the varying cable lengths in the electricity network between each user and the head-end and to strengthen against interferences in the electricity network.

The means of adapting the digital transmission to the electricity network requires a cyclic prefix of long duration, at least 7 microseconds, to adequately recuperate the signal.

Furthermore, the invention is characterized because the transmitter for the head-end and the users includes the means to share the medium in time TDMA (Time Division Multiple Access), in frequency FDMA (Frequency Division Multiple Access), and/or in Orthogonal Frequency Division Multiplexing (OFDM), that allows for the allocation of a portion of the carriers used in the communication and of the data transmitted to each user and sharing of the upstream and downstream channel by multiple users, so as to optimise the transmission speed for each user on the electricity network.

A further characteristic, complementary to the characteristic described above, is that the head-end and user receivers include the means to process information corresponding to the data transmitted in the communication in the time and frequency domains so as to recover the shared data transmitted in time and frequency.

Furthermore, the system of this invention includes the means to continuously calculate the SNR (signal to noise ratio) for each one of the carriers of the OFDM modulation in both the upstream and downstream, so that different users located at different distances from the head-end use dynamically different carriers in the same OFDM symbol, with a variable number of bits per carrier in function of the SNR calculation, optimising transmission throughput over the electricity network at all times.

To achieve this function, the system in this invention is characterized because both the transmitter for the head-end and for the users includes the means to assign and order carriers between users, so as to assign the number of bits to be associated with each one of the carriers in the OFDM modulation, from the result of the SNR calculation. It also includes the means to associate each one of the carriers with the bits assigned to make the transmission, taking into account the changes suffered by the response on the electricity line due to impedance, attenuation and the varying distances between the users and the head-end at all times and all frequencies so as to adapt transmission speed in function of the quality of transmission required for each user. Furthermore, the allocation of carriers to distinct communication provides interleaving in frequency. It is in this module where the task of sharing the medium with FDMA, TDMA and/or OFDMA is principally undertaken, as already mentioned.

This structure allows the maximum speed possible on the electricity network to be reached, because the carriers are assigned individually to the users with enough SNR, and furthermore, each one of the carriers mentioned is assigned the number of bits it can carry in function of the SNR calculation, allowing up to 8 bits to be assigned per carrier when the measure of the SNR is enough to ensure that the bit error rate of the communication flows is maintained below a certain value, where the number of bits are decided in function of established thresholds, as described earlier.

Obviously the number of 8 bits per carrier can be increased in function of technical advances.

Another characteristic of the invention is that the head-end transmitter/receiver as well as those of the users include the means to allow frequency translation to bands higher than the base band, so that the digital signals are adapted to be transmitted over the electricity network and to allow the use of spectral zones higher than the base band.

Both the head-end and users transmitter/receiver includes the means to allow analog processing, using a digital-to-analog converter that, in the case of the transmitter, sends data over the electricity network, and in the case of the receiver, receives data from the electricity network.

The analog processing includes the means to establish the voltage and power of the signal to be sent and filtering means so as to adapt the signal for transmission over the electricity network.

In one embodiment of the invention the means of frequency translation consists of IQ modulators/demodulators (in phase and quadrature) that can be digital or analog, so that in the first case the said IQ modulator is positioned before the analog processing block and in the second case it is positioned after having made the digital-to-analog conversion.

Interpolators and decimators may be introduced together with the IQ modulator/demodulator to reduce the number of points necessary to make the discrete Fourier transform (DFT).

In another embodiment of the invention the means of frequency translation comprise filtering means and the selection of one the harmonics produced by the digital-to-analog converter beginning from the second spectrum harmonic of the OFDM symbol, in which case the frequency waveform of the signals must be compensated for to compensate the response of the time to frequency conversion (typically one sinc). This avoids having to modulate the signal before sending information, due to the fact that it is already in frequency bands higher than the base band.

In a preferred embodiment of the invention, the means to make the frequency to time conversion of the OFDM symbols in transmission are set up by a device that does the complex form of the inverse of the discrete Fourier transform (IDFT), and in relation to the time to frequency conversion made by the receivers, this is achieved by means of a device that performs the complex form of the discrete Fourier transform (DFT).

The complex DFT as well as the complex IDFT and the digital IQ modulation/demodulation are used in combination to reduce the number of points necessary for the discrete Fourier transform, thereby increasing flexibility and reducing costs associated with the implementation of the system.

The frequency translation made by the transmitters in different possible embodiments, place the signals transmitted by the network above 1 MHz.

In one preferred embodiment of the invention the number of carriers is 1000 for every 10 MHz.

Furthermore, the invention is characterized because both the head-end and the users contain the means to add FEC (forward error correction) information that allocates data blocks which include redundancy that constitutes information for the correction/detection of errors, such that the FEC in each block and for each user varies so as to adapt it to the different user situations at different distances and using different frequencies.

Both the head-end and the users include the means of interleaving in time, as well as interleaving in frequency, as already described and consisting of the selection of the carriers in function of the measure of the SNR. Interleaving in time distributes the transmissible data in such a way that the errors produced due to noise in the network are spread over various data blocks. Interleaving in time, as well as interleaving in frequency, changes for each data block formed following the incorporation of the error correction, and the FEC also varies for each block, as already mentioned.

The head-end and user transmitters include the means of scrambling the data so as to avoid that fixed patterns produce signals in phase that together generate voltage peaks higher than the dynamic range of the means of analog processing, furthermore, the head-end and user receivers include the means of de-scrambling to obtain the original data transmitted (that is, the data before the scrambling process).

The method of associating each carrier with the bits to be transmitted in order to make the transmission, are set up by a variable constellation encoder, that codes the data to be sent with the number of bits assigned for each carrier, having set up the variable encoder according to one, various or all of the following modulations:

m-DPSK (differential phase modulation)
m-PSK (phase modulation)
m-QAM (quadrature amplitude modulation)
(m,n)-APSK (amplitude and phase modulation)

Moreover, the head-end and user receivers include a variable constellation decoder that decodes the data received with the number of bits specified by each carrier, wherein the variable decoder is set up according to one, various or all of the following demodulations:

m-DPSK (differential phase demodulation)
m-PSK (phase demodulation)
m-QAM (quadrature amplitude demodulation)
(m,n)-APSK (amplitude and phase demodulation).

The head-end and users receivers include the means to order the frequencies and to allocate the bits complementary to the means of ordering and allocation of frequency and the allocation of the bits of the head-end and user transmitters.

The head-end and users receivers include the means of pre-equalization, before the means of time to frequency conversion, to modify the amplitude and phase of the received signals and to compensate the modification caused by the channel in the received signal.

The analog processing means also contain means of amplifying and/or attenuating, that are connected to a hybrid circuit and to a separator to allow the introduction/extraction of the signal from the electricity network while eliminating the component that this brings (50-60 Hz).

Both the head-end and users modems include a module to control the synchronization between the head-end and users modems.

Both the head-end and users receivers and transmitters include a frequency processing module, which in the case of the user transmitter and receiver is made up of a power pre-equalization module, or power mask, and an angle corrector rotor that rotates the constellations to correct frequency and phase errors, while the frequency processor in the head-end receiver includes a power pre-equalization module.

The frequency equalizer (FEQ) carries out the equalization of each one of the received signal carriers. This function occurs in reception both in the up-stream and the down-stream and allows the recovery of the signal while avoiding interference between symbols and the effects of degradation due to the electricity network. The SNR may be obtained using the control signals in this system.

In one embodiment of the invention the frequency error correction in reception occurs by altering the speed of the sampling clocks in the analog-to-digital converters in the receivers.

In another embodiment of the invention the frequency error correction occurs by re-sampling the digital signal obtained in the receiver.

The head-end and users receivers include the means of extracting the cyclic prefix of the OFDM signals received, using the information obtained in the synchronization module to eliminate that part of the received signal contaminated by echoes due to the multi-path propagation of the signal in the electricity network and to obtain the OFDM signals.

The SNR can be calculated from the difference between the expected signal and that received over a certain period of time.

The transmission speed is adapted by means of comparing the SNR with certain previously fixed thresholds, chosen in function of the different modulation constellations used in the system.

The thresholds established include hysteresis to avoid continuous changes if the SNR coincides with any one of the thresholds, and from these the number of bits per carrier is obtained, controlling the speed of transmission.

The head-end MAC includes the means of adding an indicative header to the data sent identifying to whom the data is sent and the form in which it has been encoded, so that the various users know to whom the transmission from the head-end is directed. Furthermore, the head-end MAC is also responsible for identifying which users may transmit via the upstream channel in each time period and which carriers may be used, utilizing the header for the packets sent by the downstream channel or sending specific messages shared by the users.

The information transmitted in the header, in the downstream channel, is received by, and can be decoded by each one of the users. Starting from the destination information of this header the user determines whether the information contained in the packet should be recovered or not.

The MAC in the head-end transmitter/receiver is responsible for communication control and the sharing of the transmission over the electricity network in time and frequency between the various users, and the administration of each one of the connections.

The head-end MAC is much more complex than that of the users because, apart from the storing information of bits per carrier for each one of the users, it includes an advance logic to make decisions on the assignation of transmission time and frequencies for each user as well as synchronization requests, equalization, etc.

For this reason, the MAC is responsible for allowing the users to transmit in the upstream and downstream channels, in frequency, time and code.

Furthermore, the invention refers to a process for the digital transmission of data, point to multipoint, over the electricity network, comprising the following phases:

adapting the digital signal of the transmissible data and multiplexing it to prepare it for transmission adding error correction information to introduce sufficient redundancy to make the correction and/or detection of errors in reception interleaving in time to increase the probability of correction and/or detection of burst errors of the type produced by the electricity network frequency interleaving of the carriers of the OFDM modulation measure the SNR dynamically assigning the number of bits per carrier in function of the SNR and the quality required by each user coding each of the carriers in the OFDM modulation with the number of variable bits per carrier assigned transforming the encoded signal from the frequency domain to the time domain via an inverse Fast Fourier transform adding the cyclic prefix to the signal obtained in time in order to avoid that the echoes produced in the multipath propagation in the electricity network create errors in the reception of the OFDM symbols translation in frequency of the signal obtained to use bands higher than base band so as to adapt the transmission to the electricity network and to use higher spectral bands converting the digital signal to an analog signal adapted to be sent through the network For the reception the inverse process is used.

Furthermore the process of the invention includes a scrambling phase to avoid clipping peak voltage. Digital to analog converters, filters and analog gain amplifiers can produce this effect in instances where multiple carrier signals are generated in phase, so that the output voltage of the system is increased by adding them.

To use bands higher than base band, the frequency translation of the signal obtained can be made in the digital domain, in the analog domain, or a combination of both.

To facilitate a better understanding of the invention described herein and as an integral part of this document, we include a series of drawings that illustrate without limitation, the purpose of the invention.

BRIEF DESCRIPTION OF THE DRAWINGS

Embodiments of the present invention will now be described with reference to the accompanying drawings in which.

DESCRIPTION OF AN EMBODIMENT OF THE INVENTION

What follows is a description of the invention based on the figures previously mentioned.

As previously mentioned the invention consists of a system for full-duplex transmission over the electricity network at high speed between a head-end and a plurality of users using a master-slave architecture.

The communication from the head-end to the users is referred to as downstream communication or downstream channel, and the communication from the users to the head-end is referred to as the upstream communication or upstream channel.

Figure 1:
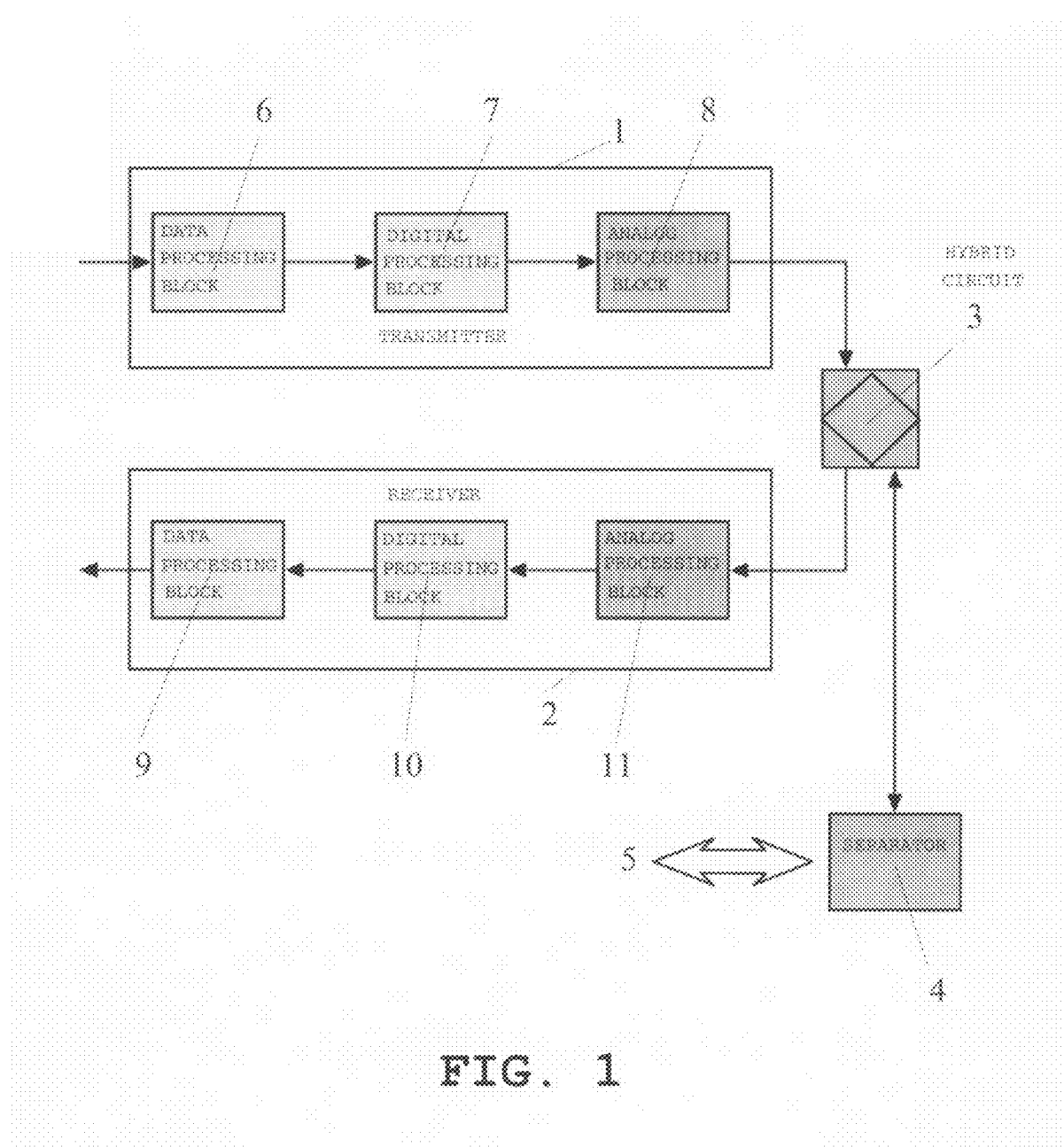
FIG. 1 is a block diagram of the principal blocks that make up the general structure of the system and its connection to the electricity network.

As in FIG. 1, both the head-end and the users contain a transmitter 1 and a receiver 2 that through a hybrid circuit 3 and from a separator 4 are connected to the electricity network 5 to permit carrying out the communication between the head-end and the users.

Both the transmitter 1 of the head-end and that of the users take the form of a general structure comprising a data processing block 6, which takes the information that the equipment that makes use of the modem wants to send, adapts it, composes the frames to be sent and delivers them to a digital processing block 7, that carries out the OFDM modulation and the frequency translation to use higher bands than base band, so as to adapt it to the electricity network and to utilize higher spectral zones to the base band, and deliver the signal to an analog processing block 8, responsible for adapting the signal to the analog environment so as to be able to transmit it over the electricity network, converting the digital signal to analog, and filtering it to remove out of band components, and amplifying it to be transmitted through the electricity network.

The analog processing block 8 constitutes the medium by which the connection between transmitter 1 and the hybrid 3 is made, as well as separating the transmission and reception signals so that the maximum power is transmitted to the transmission line and the maximum signal is received from the electricity network, whereby the separator 4 is responsible for permitting the sending and receiving of data through the electricity network 5, by means of a filter that eliminates the frequency of the network in reception and allows the signal being sent pass through for transmission over the electricity network.

Equally, the receiver 2, both of the head-end and of the users, includes an analog processing block 11 that receives the analog signal transmitted by the network and converts it to digital, prior to amplification and filtering, and delivers it to a digital processing block (10) that translates the frequency band used to carry out the transmission through the electricity network to base band, at the same time it recuperates the OFDM demodulated symbols and delivers them to a data processing block 9, where, from the recovered frames, the original information sent is recovered and delivered to the corresponding electronic equipment: computer, television set, etc.

Figure 2:
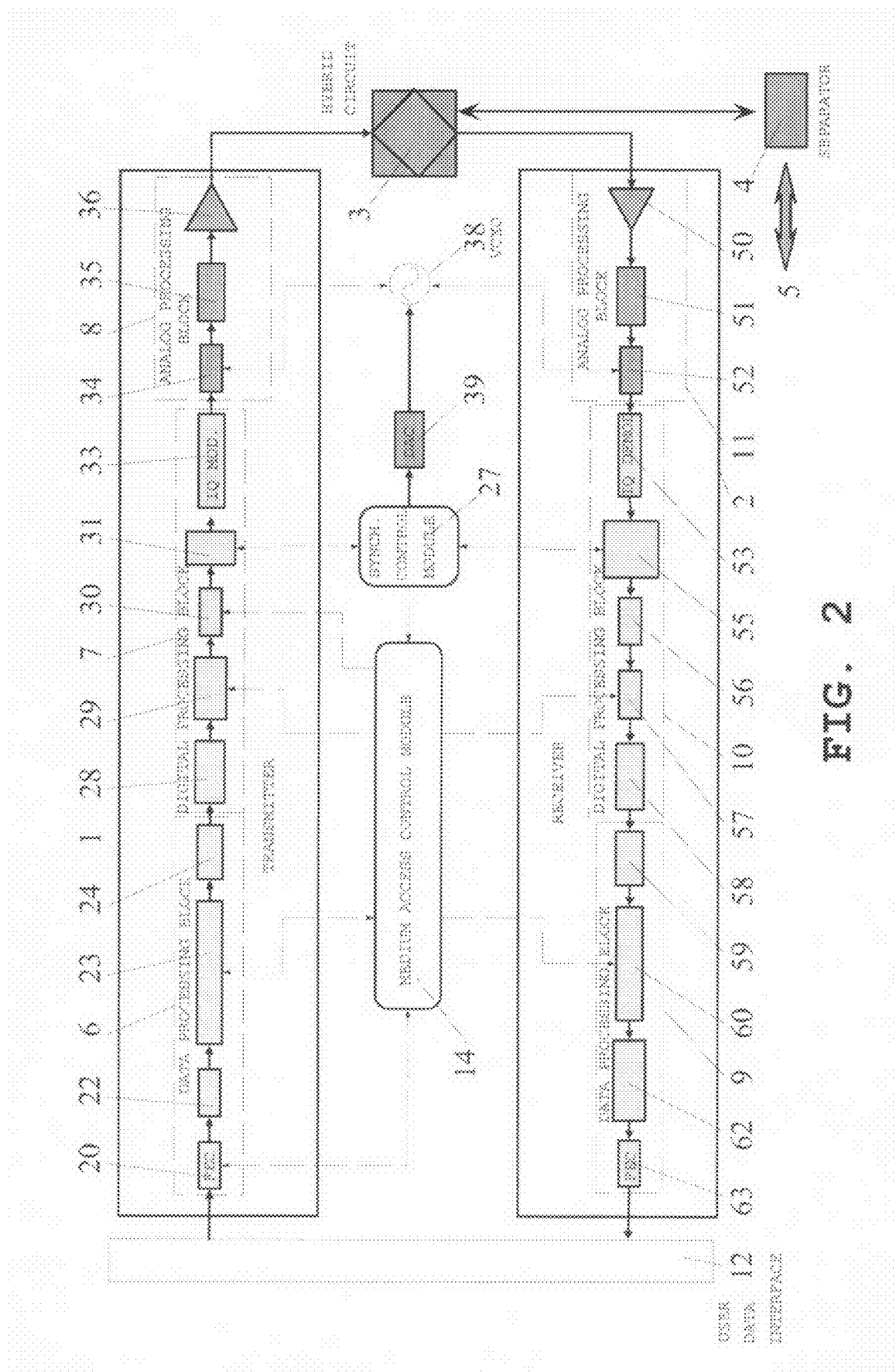
FIG. 2 is a functional block diagram of the system of this invention in which blocks represented in FIG. 1 are divided into their various parts.

With the aid of FIG. 2, the system is described in greater detail in which both the transmitter 1 and the receiver 2 are connected to a user data interface 12 that enables communication between the modem and the electronic equipment.

Figure 4:
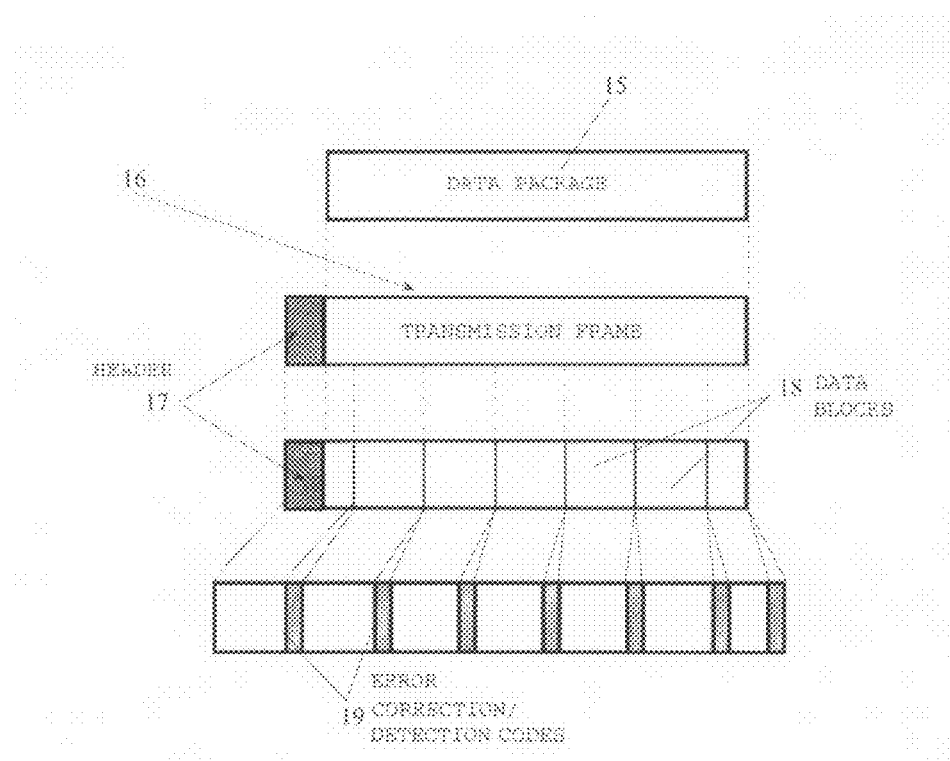
FIG. 4 is a schematic diagram of an example of how the information is configured to the point where the error correction code is added.

In the data processing block 6, the data package 15 (FIG. 4) is multiplexed to be sent. This block composes the frame 16 for transmission under the control of a Medium Access Control module (MAC) 14 so that a header 17 is added to indicate to whom the data package 15 is directed, the means of encoding the data, the priority, the type of message, etc.

The forward error correction (FEC) module 20 takes data blocks 18 composed of a specific number of bytes and adds error correction and/or error detection codes 19 to each one of the blocks 18 to introduce sufficient redundancy to carry out the correction/detection of errors in reception. The error correction/detection codes 19 can be any of those known in the state of the art for example BCH, REED-SOLOMON, REED-MULLER, etc.

It is important to indicate that the error correction/detection code can vary for each block of data 18 and for each user, as will be explained later.

Therefore, the FEC 20 carriers a number of bytes and on exiting obtains a greater number of bytes that contain the initial information as well as more redundancy introduced by the error correction/detection codes.

The FEC is governed by the MAC 14.

Furthermore, the data processing block 6 includes a block for interleaving in time 22 that improves the characteristics of error correction when faced with the bursts of noise produced in the electricity network. Thanks to this block the noise burst errors are transformed into scrambled errors after carrying out the de-interleaving, that is, they remain disseminated in various blocks of data, so that the errors produced by these noises on the electricity network do not produce adjacent errors in reception. So, therefore the interleaving in time block 22 carries out a re-ordering attending to distinct lengths of block, where these lengths are a function of the desired protection to offer in the system mainly based on the average duration of impulse noise in the channel. Therefore the length of the blocks and the number of blocks obtained from FEC 20 takes into account the average characteristics expected in the channel.

Figure 5:
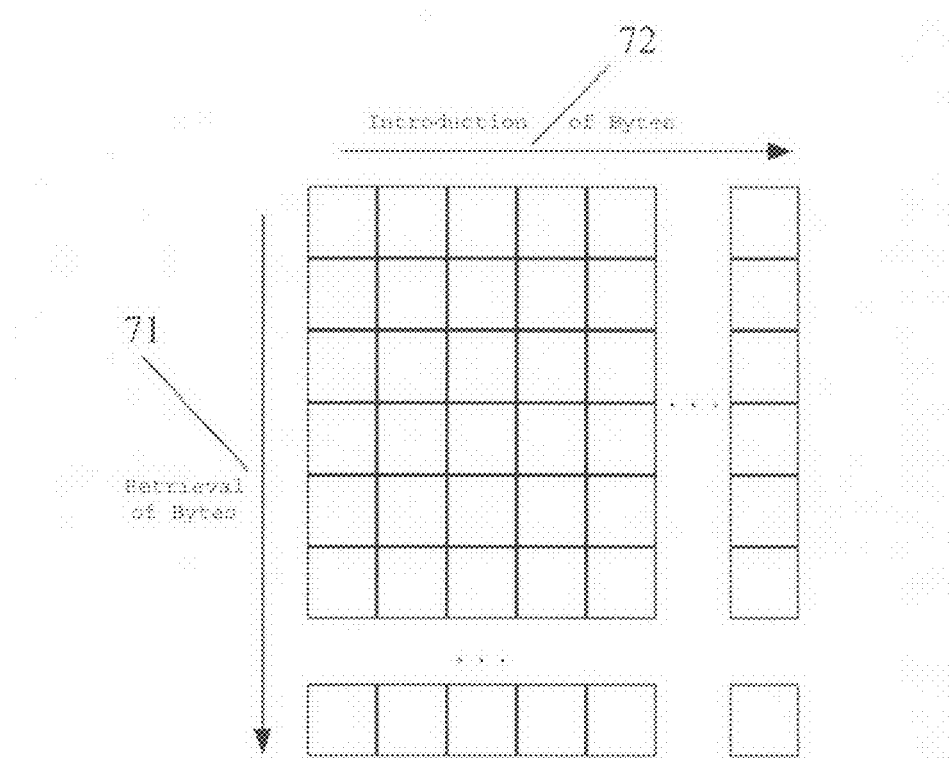
FIG. 5 is a schematic diagram of an example of how the information is treated in the interleaving in time block.

FIG. 5 shows a possible example of interleaving in time, where in the case in question, it is produced by means of introducing the bytes in rows 72 and extracting said bytes in columns 71, so that what is produced is the interleaving previously mentioned.

Figure 6:
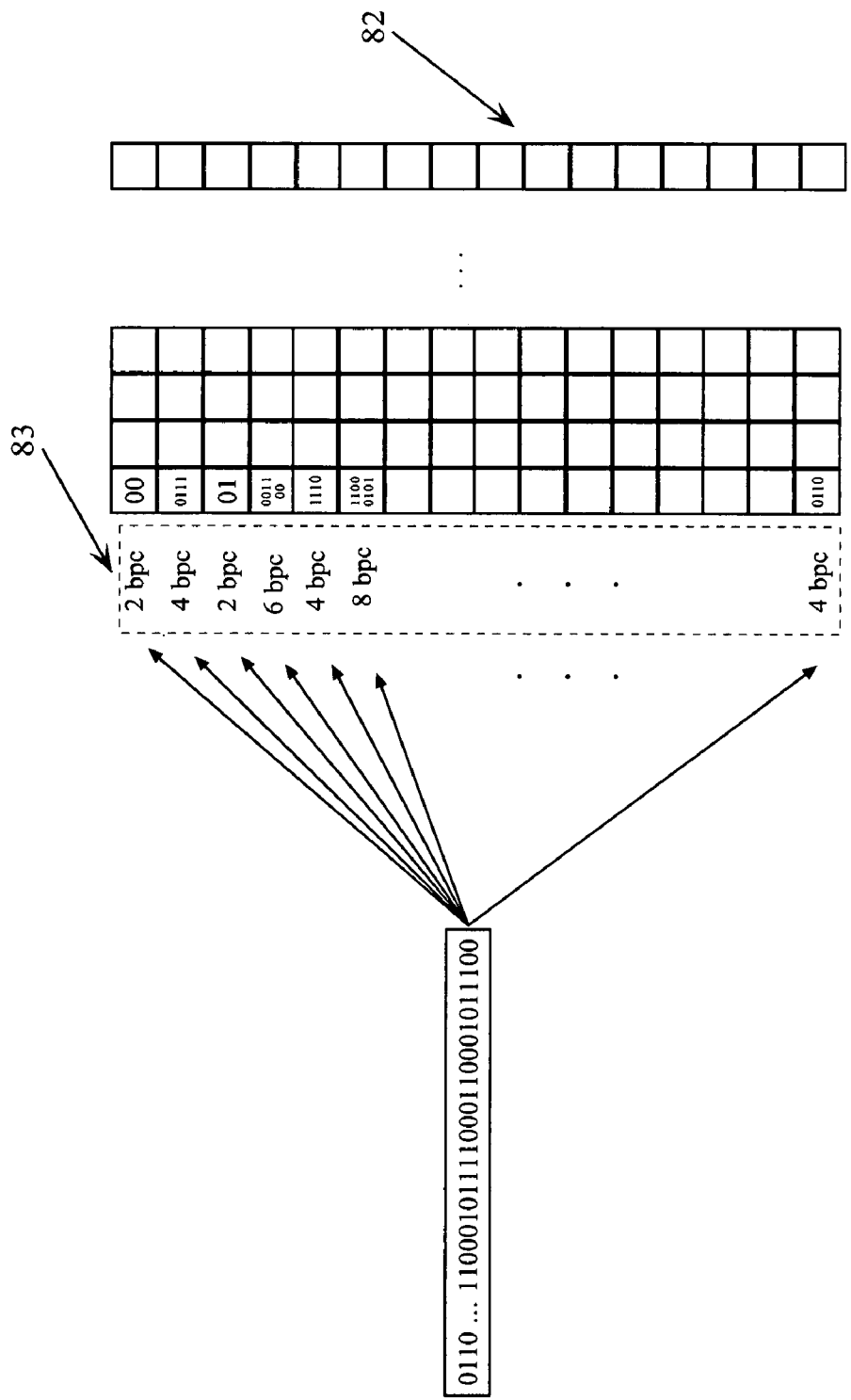
FIG. 6 is a view of a possible example of the form of the assignation of bits and ordering of frequencies.

Following on from the interleaving in time, the data processing block 6 includes a bit assigner and frequency ordering 23 that carries out the interleaving in frequency, for which the MAC 14 informs of the carriers available at each moment and the ones that should be utilized in each communication 82; all of this starting from the measurement of the SNR carried out for the digital processing block 10 of the receiver 2, as will be described later. Thus the bit assigner and the frequency ordering 23 assigns the bits of the package to be transmitted to each one of the carriers selected for the communication. It produces the data in parallel 83. FIG. 6 shows a particular example where the SNR measurement has determined the number of bits at each carrier (2 at the first carrier, 4 at the second carrier, 2 at the third carrier, etc.) and the bits of the package to be transmitted are, from right to left, 0110 . . . 1100010111100010001011100. These bits are assigned to the different carriers according to the measured SNR, so the first two bits are assigned to the first carrier (00), the next four bits are assigned to the second carrier (0111), the next two bits are assigned to the third carrier (01), and so on.

Therefore, the characteristics as mentioned for the data processing block 6 determine the execution of a time division multiple access (TDMA), a frequency division multiple access (FDMA) and the orthogonal frequency division multiple access (OFDMA).

TDMA is performed by means of controlling in every single moment of time for which user the communication is intended (utilizing all or part of the carriers available for the transmission).

FDMA is carried out by means of controlling the bit assigner and frequency ordering 23 on the part of the MAC 14, to indicate what carriers should be utilized for the transmission.

In OFDMA each user is offered a portion of the total usable carriers in the communication.

The interleaving in frequency can change for each package of information to be sent and for each user, and it adapts itself to the different users situated at different distances and using different frequencies, as it is explained further on.

This structure permits maximum use of the upstream and downstream channels, since the sharing process is carried out in frequency and in time, both in the upstream channel and the downstream.

Finally, the data processing block 6 includes a scrambler 24 that avoids producing patterns of bits that generate signals in phase in multiple carriers. This generation of in phase signals could increase the voltage at the exit of the analog processing block 8, and could exceed the dynamic range of block 8, with the result that cuts in the voltage peaks would be produced. The scrambler reduces the probability of said peaks occur.

Following on from this, the data passes to the digital processing block 7 (FIG. 2) that has a constellation encoder 28 that can be: m-DPSK (differential phase modulation), m-PSK (phase modulation), m-QAM (quadrature amplitude modulation) and/or (m, n)—APSK (amplitude and phase modulation), so as to optimize the quantity of transmittable data when using an encoder with a variable number of bits per carrier that depends on the channel characteristics measured in each moment and on the desired communication speed, which is indicated by means of the parameters "n" and "m" of the different encodings indicated. Therefore upon exiting the constellation encoder 28 an OFDM digital modulation in the frequency domain (orthogonal division multiplexing in time) is obtained.

Subsequently the coded signal is introduced in a frequency domain processor 29, which is governed by the MAC 14, and whose configuration varies depending on whether it is the head-end transmitter or the user transmitter. In the case that it is the user transmitter the frequency domain processor 29 consists of a power mask and a rotor. The power mask acts like a pre-equalization before the known frequency characteristics of the channel, modifying the amplitude of the signal received in the frequencies used in the communication, and the rotor compensates for the small variations of frequency and phase due to the changes in the function of transfer of the channel that cause the constellation in reception to be "rotated" regarding transmission.

The frequency domain processor of the head-end only includes a power mask that carries out the said pre-equalization, since there is no need to include the rotor given that both the transmitter and the receiver of the user include said rotor avoiding that the modem of the head-end has to carry out this function.

The preferred algorithm for computation of the discrete Fourier transform (DFT) is FFT (fast Fourier transform), due to the high efficiency of this algorithm. In the same way the inverse of DFT would be carried out preferentially with the algorithm IFFT (inverse of fast Fourier transform).

Subsequently, the digital processing block 7, has a device IFFT 30 that carries out the complex inverse of the fast Fourier transform with which it performs the translation of the frequency domain to the time domain, and subsequently eliminates the parallelism produced by the bit assigner and frequency ordering 23 that distributed the information in a series of carriers by means of the governing MAC; obtaining a single signal.

After carrying out the transformation to the time domain, the signal is introduced in a cyclic prefix generator 31 that consists of a storage device that is controlled by the MAC 14 to create a cyclic prefix 65 (FIG. 7), which is a repetition in time of the final part of the OFDM symbol that is to be transmitted. In this figure, the previous symbol 74 and the subsequent symbol 75 are also represented.

The signal is then introduced into an IQ modulator 33 (in phase and quadrature), subject to passing through an interpolator, so that by means of the interpolator an adequate number of samples are obtained before carrying out the IQ modulation. This modulation carries out the translation of the frequency in the base band to an upper band adapting it to the electricity network.

The employment of the complex IFFT together with the IQ modulator facilitates the frequency translation, since the input of the IFFT device 30 are the signals of the carriers pertaining to the distinct entrances, that are introduced directly, and its exit is a complex signal (that is to say, a signal whose imaginary part is distinct from zero). It permits the realization of the IQ modulation directly upon this exit since the real part corresponds with the signal in phase (I) while the imaginary one corresponds with the signal in quadrature (Q) or vice versa, and only has to multiply with an oscillator of the adequate central frequency to transfer the band to this central frequency, which reduces the hardware structure considerably.

Figure 3:
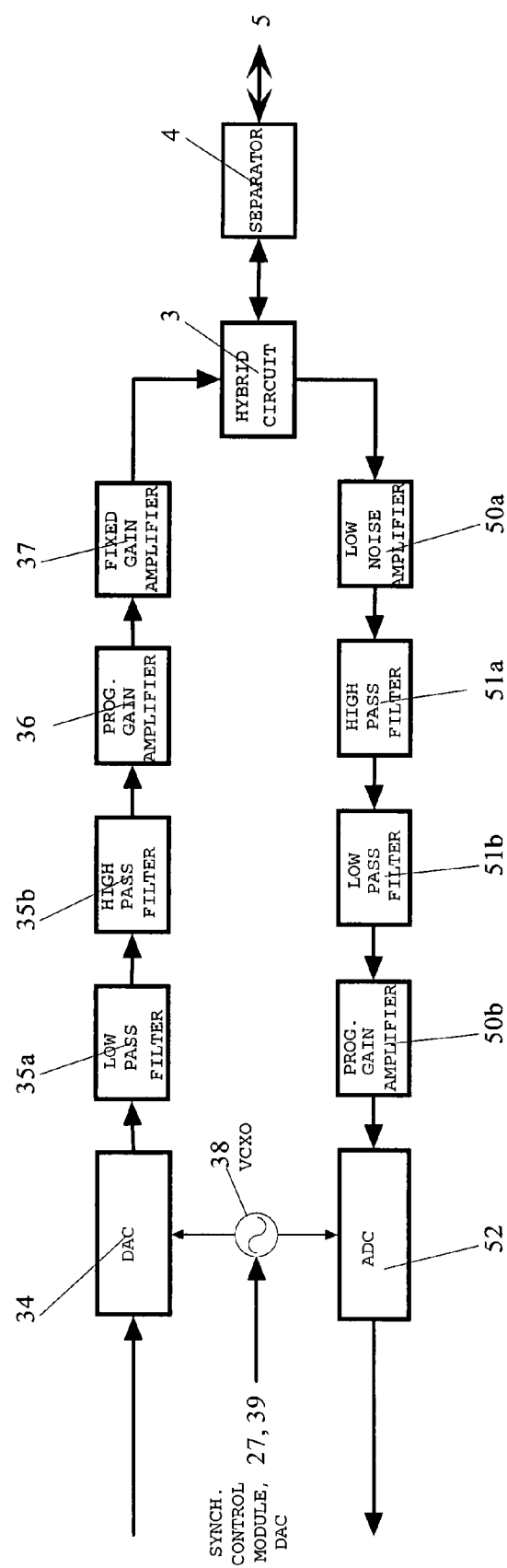
FIG. 3 is a detailed view of the development of the block concerning the analog processing, shown in FIG. 2.

The exit of the IQ modulator 33 applies to the analog processing block 8, which includes a digital-to-analog converter 34 that converts the modulated digital signals to analog for transmission through the electricity network 5 (FIG. 2 and FIG. 3).

At this point it must be stated that because of this, the IQ modulation is digital, but likewise an analog IQ modulation may be carried out, that is to say after the digital to analog converter, notwithstanding that this represents a significant modification in the design of the system.

In addition, the analog processing block 8 has a smoothed filter 35 that is comprised of a low pass filter 35a and a high pass filter 35b that follows a programmable gain amplifier 36 that also is united to a fixed gains amplifier 37 so that the levels of the signal are adapted to transmission and so as to assure the connection between the extremes. This signal is applied in the hybrid 3 and subsequently in the separator 4 that introduces the signal in the electricity network filtering the network component of 50-60 Hz, to avoid the saturation of components in reception.

The operating frequency of the digital-to-analog converter 34 is governed by the synchronization control module 27 for which this provides a digital signal to a digital-to-analog converter 39 that provides on its exit a voltage signal to rule the operation of an oscillator controlled by voltage 38 that applies to the digital-to-analog converter 34 of the analog processing block 8.

The data transmitted comprises a header coded by means of a robust modulation, as for example QPSK modulation, to withstand noises or errors produced in the line, and the original data where the coding itself depends on the constellation utilized in each carrier in its transmission as already discussed. This header includes information regarding which user modem or modems are the destination of the information, the priority, the size, etc. These headers must be understood by each and everyone of the user modems, which have to demodulate the head-end, including cases in which the SNR is low, and is made possible thanks to the QPSK modulation, the FEC with high correction, and the redundancy previously commented. This redundancy consists of sending the information repeatedly a specific number of times in distinct frequencies, in distinct times, and/or in distinct codes, so that the user modems are able to demodulate the information of the header with greater confidence.

The signal sent by the electricity network is received by the receivers 2, which carry out the inverse process of transmission, for which the analog processing block 11 has an amplifier 50 (FIG. 2 and FIG. 3) that includes a low noise amplifier 50a and a programmable gain amplifier 50b, in addition to having a filter 51 that is comprised of a low pass filter 51a and a high pass filter 51b, that actually delivers the signal to the programmable gains amplifier 50b, for the subsequent analog-to-digital conversion of the signal by means of the corresponding converter 52 that likewise is governed by the synchronization control module 27, through the oscillator controlled by voltage 38.

Afterwards the information passes to the IQ demodulator 53, which delivers it to a decimator. After carrying out the demodulation, and the further filtered decimation, the cyclic prefix 65 is extracted by means of a cyclic prefix extractor 55 so that the uncontaminated part of the symbols, where the contamination is mainly due to the echoes of the multipath propagation, is taken out.

Figure 7:
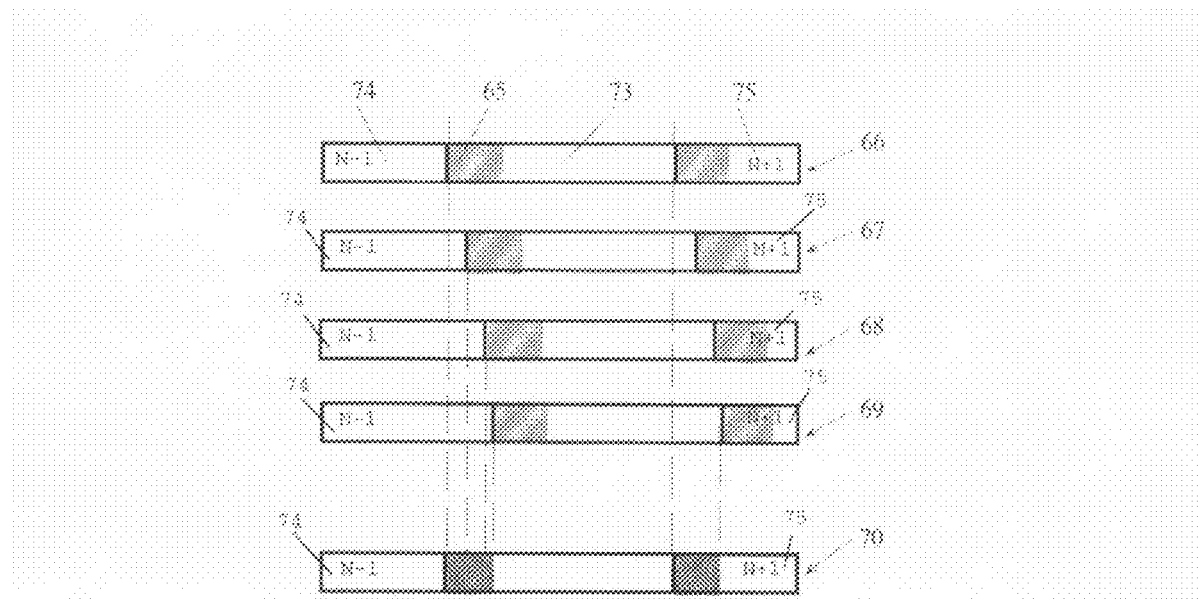
FIG. 7 is a generic view of the form in which the different symbols of the OFDM modulation with the cyclic prefix are received, where in the objective is to demonstrate the importance of selecting the adequate cyclic prefix.

FIG. 7 schematically represents the direct wave 66, that arrives directly at the receiver, as well as the different echoes 67, 68 and 69, which along with 70 represent the signal that the receiver obtains from all that went before, and for which it is necessary to choose a long symbol period and an adequate cyclic prefix to assure the correct reception. In the current embodiment the cyclic prefix is on the order of 7 microseconds.

The reception signal is windowed in order to permit the correct recovery of the OFDM symbols, and therefore the need to carry out equalization of the signal in time is avoided.

Once the sent OFDM symbols are correctly extracted they pass to an FFT device 56 (fast Fourier transform) that carries out the conversion of the signal from time to frequency and delivers it to a frequency equalizer 57.

All this process is controlled by the synchronization control module 27 so that the sampling carried out in each one of the receivers of the multipoint communication are similar to that carried out in the head-end modem, and so that it is possible to know the start of each OFDM symbol in reception and thus to be able to extract the cyclic prefix carrying out the correct windowing.

The frequency equalizer 57 comprises a frequency domain processor that makes the symbol on its exit as close as possible to the symbol sent from the transmitter, compensating for the behaviour of the channel that introduces attenuation and phase distortion in each one of the carriers utilized in the communication.

As mentioned, the electricity network is not stable in time, therefore the process of equalization should be carried out in continuous form.

By means of the frequency domain processor 57, the SNR is obtained, and it will be utilized to carry out the assignment of bits in the transmitter. In the current embodiment, said SNR is obtained as part of the error signal calculation in the frequency equalization, since the power utilized in transmission is known.

The measurement of the SNR is carried out over a specific period of time before validating the new SNR in a carrier, so as to avoid the production of instantaneous false values of SNR due to punctual noises in the electricity network. As commented previously the SNR information is utilized to assign the bits to the different carriers and thus to adapt the speed of transmission.

In the system of this invention from zero to eight bits per carrier can be used as a function of the value of the SNR obtained as previously indicated. At present, none of the systems employed in transmission over the electricity network allows for the incorporation of more than two bits per carrier, and therefore they have a slow transmission speed, an issue that is solved by the system described in this invention.

Figure 8:
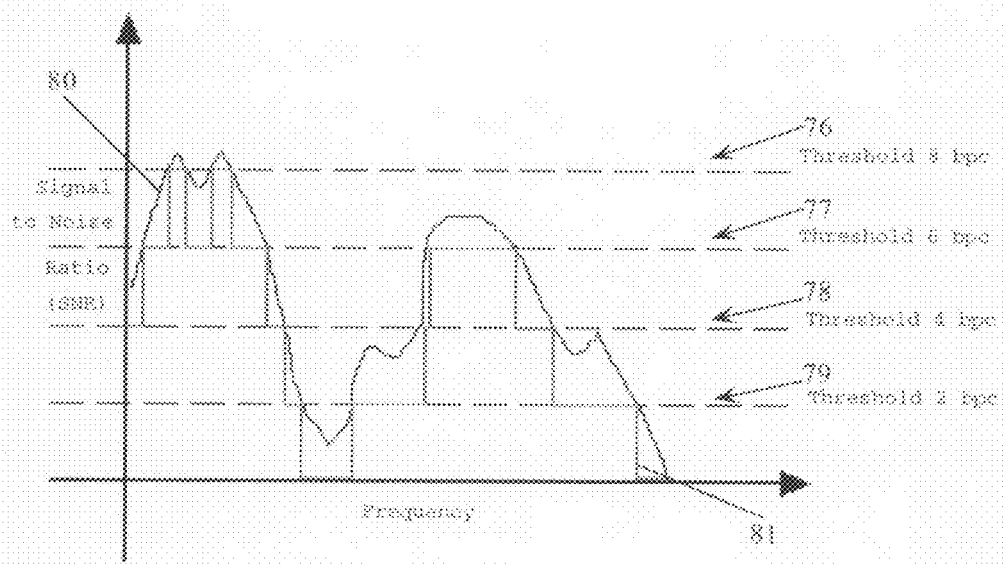
FIG. 8 is a graph that depicts an example of the selection of the different established thresholds in function of the measurement of the signal to noise ratio for each frequency.

Therefore, in function of the bits employed by the carrier, the transmission speed is adapted, for which the measured SNR 80 is compared with a series of thresholds 76 to 79 (FIG. 8) to which certain hysteresis has been introduced so as to avoid continuous changes if the SNR coincides with some of the thresholds; and from this the number of bits per carrier (bpc) in each group of frequencies 81 is obtained. FIG. 8 shows a possible example of the different thresholds established for the selection of bits per carrier.

The process of adaptation is repeated continuously for all the carriers, or for one or various sets of them, so that the maximum applicable speed is reached over the electricity network at all times, according to the immediate characteristics of the channel that vary in function of time due to the characteristics of the electricity network, as already commented previously.

As indicated previously the MAC 14 assigns different carriers for the different users, as well as the number of bits to be associated with each one of them. This function follows on from the SNR obtained, assigning the carriers that a user cannot utilize, due to the fact that they have a low SNR, to other users that have sufficient SNR so as to be able to utilize them. Furthermore, it assigns the frequencies to distinct users in function of the bits per carrier that they can utilize in each one of the carriers.

Subsequently the signals obtained pass through a variable constellation decoder 58 that carries out the demodulation of the carriers of the OFDM symbols and then it de-scrambles them by means of a de-scrambler 59 and the FDMA and TDMA demodulation is carried out by means of a module of assignment of bits and arrangement of frequencies 60 complementary to that 23 described for the transmitter.

In addition the receiver has a de-interleaved block 62 complementary to the interleaved block 22 of said transmitter. Subsequently the error correction/detection is carried out by means of the FEC device 63 that delivers the data to the interface 12 with the external equipment.

Therefore except for the difference already indicated, the head-end and user modems have a similar configuration, and with one added difference, as can be concluded from the description already given, that is, the MAC processor 14 in the case of the head-end modem has a more complicated configuration than in the case of the users, since it has to store the number of bits per carrier that should be sent to each of the users, and in addition includes the header governing from and to whom the information is directed as well as the frequencies and periods of time that each one of the users can utilize.

Furthermore, in the system of this invention, the process described in the section concerning the description of the invention is applicable, and can be deduced clearly from the explanations carried out with the aid of the figures.

The invention claimed is:

1. System for digital transmission of data, point to multipoint over an electricity network, that comprises a communication in a downstream channel, determined by a link from a head-end to various different users, and a communication in an upstream channel, determined by a link from each of the users to the head-end, where a communication medium is an electricity network and communication is achieved by means of an OFDM modulation (orthogonal frequency division multiplexing) to obtain OFDM symbols, where both the head-end and the users contain a transmitter/receiver that includes a medium access control module (MAC) to provide a master-slave communication, as well as means to add/extract a cyclic prefix in the OFDM symbols and means of converting the OFDM symbols from a frequency domain to a time domain and from the time domain to the frequency domain, and digital-to-analog and analog-to-digital converters; the transmitter/receiver of the head-end and the users comprising:

means to adjust a digital signal to the electricity network that provide:
an OFDM modulation with a carrier width reduced to at least 1.5 KHz and with a number of carriers increased to at least 500 carriers for each 10 MHz to strengthen against selective frequency fadings arising from varying cable lengths in the electricity network between each user and the head-end and to strengthen against interferences in the electricity network; a cyclic prefix of long duration, at least 7 microseconds, to recover the signal;
where the transmitter includes means of sharing the medium in time TDMA (Time Division Multiple Access), in frequency FDMA (Frequency Division Multiple Access), and/or in Orthogonal Frequency Division Multiple Access (OFDMA), of the data transmitted in both the upstream and downstream channels for multiple users;
where the receivers include means to process information corresponding to the data transmitted in the communication in the time and frequency domains, to reach maximum throughput;
means to continuously calculate an SNR (signal to noise ratio) for each of the carriers in the OFDM modulation in both the upstream and downstream, so that different users located at differing distances from the head-end use dynamically different carriers in the same OFDM symbol, with a variable number of bits per carrier, maximizing the throughput of the channel in time;
where the transmitter includes means to continuously assign the carriers and the number of bits per carrier to each of the carriers in the OFDM modulation from the result of the SNR calculation, and means to associate the number of the bits to be transmitted to each designated carrier to achieve the transmission taking into consideration a degradation of the electricity line response at different distances between the users and the head-end in each frequency, and to adjust transmission speed in function of the SNR calculation and a quality of transmission required for each user;

means to translate the frequency to user bandwidths higher than base band, so as to be adjusted to the electricity network and to allow the use of spectral zones superior to base band; wherein the SNR calculation is calculated from a difference of a signal expected and a signal received over a certain time period, and in that the transmission speed is adjusted by comparison of SNR with certain previously fixed thresholds that are a function of different modulation constellations used in the system and a maximum rate of errors allowed at any time, wherein the thresholds previously established contain hysteresis.

2. System for digital transmission of data, point to multi-point over an electricity network, according to claim 1, wherein said means of frequency translation are constituted by IQ (in phase and quadrature) modulators and demodulators.

3. System for digital transmission of data, point to multi-point over an electricity network, according to claim 2, wherein said IQ modulators and demodulators are digital.

4. System for digital transmission of data, point to multi-point over an electricity network, according to claim 2, wherein said IQ modulators and demodulators are analog.

5. System for digital transmission of data, point to multi-point over an electricity network, according to claim 1, wherein said means of frequency translation comprise a filtering process and a selection of a harmonic, starting from a second harmonic, in a spectrum of the OFDM symbol at an output of the digital-to-analog converter.

6. System for digital transmission of data, point to multi-point over an electricity network, according to claim 5, wherein it includes means of pre-equalizing the selected harmonic to avoid that different frequencies receive different treatment by the action of the digital-to-analog converter.

7. System for digital transmission of data, point to multi-point over an electricity network, according to claims 2 or 5, characterized in that said frequency translation (33) made by the transmitters places signals transmitted through the network above 1 MHz.

8. System for digital transmission of data, point to multi-point over an electricity network, according to claim 1, wherein said means of making the frequency to time conversion of the OFDM symbols in the transmitters are set up by a device that makes a complex form of an inverse of a discrete Fourier transform (IDFT), and because the time to frequency conversion made by the receivers occurs via a device that makes a complex form of a discrete Fourier transform (DFT).

9. System for digital transmission of data, point to multi-point over an electricity network, according to claims 3 or 8, wherein a complex DFT is used in combination with said digital IQ demodulator including interpolators and decimators to reduce a number of points needed in the discrete Fourier transform.

10. System for digital transmission of data, point to multi-point over an electricity network, according to claim 1, wherein both the head-end and the users contain means to dynamically add FEC (forward error correction) information that allocates data blocks which includes information for correction/detection of errors, so that the FEC in each block and for each user varies in order to adjust it to the different user situations at different distances and using different carriers.

11. System for digital transmission of data, point to multi-point over an electricity network, according to claim 1, wherein both the head-end and the users include the means of interleaving in time, to distribute the data of the information transmitted in such a way that errors produced by noise in the network are spread over various data blocks in reception.

12. System for digital transmission of data, point to multi-point over an electricity network, according to claims 10 or 11, wherein a FEC code and an interleaving in time change for each packet of information to be transmitted and for each user, to adjust them to the communication with different users situated at different distances from the head-end and using different carriers of the OFDM modulation.

13. System for digital transmission of data, point to multi-point over an electricity network, according to claim 1, wherein said head-end and users transmitters (1) comprise means to allow analog processing in order to make the transformation from a digital to analog domain and that includes a digital-to-analog converter, means to establish the voltage and power of an analog signal to be sent, and means of filtering to adjust the analog signal to be transmitted over the electricity network; while the head-end and user receivers include means of analog processing to make a transformation from the analog to digital domain by means of an analog-to-digital converter to recover an original digital signal.

14. System for digital transmission of data, point to multi-point over an electricity network, according to claim 1, wherein said head-end and user transmitters comprise an interface connection with an external equipment.

15. System for digital transmission of data, point to multi-point over the electricity network, according to claim 13, wherein said head-end and user transmitters comprise means of scrambling to avoid that certain data patterns produce signals in phase with peak voltages higher to those admissible by the analog processing means; and where the head-end and user receivers include means of de-scrambling to obtain the original data previous to the scrambling process.

16. System for digital transmission of data, point to multi-point over an electricity network, according to claim 1, wherein said head-end and user transmitters include means of interleaving in frequency, made up by a tone ordering and association module so as to assign the OFDM carriers in the upstream/downstream carriers to each one of the users and to assign without interruption the number of bits associated with each carrier in the OFDM modulation.

17. System for digital transmission of data, point to multi-point over an electricity network, according to claim 16, wherein said means of associating the bits to be transmitted with each carrier so as to make the transmission comprise a variable constellation encoder, that encodes the data to be sent with the number of bits specified for each carrier, wherein the variable encoder is constituted by one, various or all of the following modulations:

m-DPSK (differential phase modulation),
m-PSK (phase modulation),
m-QAM (quadrature amplitude modulation),
(m,n)-APSK (amplitude and phase modulation).

18. System for digital transmission of data, point to multi-point over an electricity network, according to claim 17, wherein said head-end and user receivers include a variable constellation decoder that decodes the received data with the number of bits specified for each carrier, wherein the variable decoder is constituted by one, various or all or the following demodulators:

m-DPSK (differential phase demodulation)
m-PSK (phase demodulation)
m-QAM (quadrature amplitude demodulation)
(m,n)-APSK (amplitude and phase demodulation).

19. System for digital transmission of data, point to multi-point over an electricity network, according to claim 16, wherein said head-end and user receivers include complementary tone ordering and association module to the tone ordering and association module in the head-end and user transmitters.

20. System for digital transmission of data, point to multipoint over an electricity network, according to claim 1, wherein said head-end and user receivers include means of pre-equalization, to modify amplitude and phase of the received signals.

21. System for digital transmission of data, point to multipoint over an electricity network, according to claim 13, wherein said analog processing means include furthermore, amplifiers and/or attenuators, connected to a hybrid circuit and to a separator to allow introduction/extraction of the analog signal in/from the electricity network eliminating the component that is carried by the network (50-60 Hz).

22. System for digital transmission of data, point to multipoint over an electricity network, according to claim 1, wherein said head-end and users comprise a module to control synchronization between the transmitter and the receiver, making an error correction in frequency and windowing the signal in time.

23. System for digital transmission of data, point to multipoint over an electricity network, according to claim 19, wherein it includes a frequency domain processing module that is made up of a module for power pre-equalization and by a rotor for correction of a rotated angle of the constellations to be sent through the electricity network in a case of the transmitter and receiver of the users; and a medium access controller in the head-end transmitter and receiver, that is linked to a frequency domain processing module that comprises a power pre-equalization module; all of this allows the head-end transmitter and receiver to avoid having to make any correction in the constellation angle in the upstream channel.

24. System for digital transmission of data, point to multipoint over an electricity network, according to claim 1, wherein said head-end and user receivers include a frequency equalizer (FEQ) that makes equalization in each one of the carriers both in the upstream and downstream, to allow a coherent demodulation of the information transmitted in these carriers.

25. System for digital transmission of data, point to multipoint over an electricity network, according to claim 22, wherein said error correction in frequency is made by altering a sampling speed in master clocks of the analog-to-digital and digital-to-analog converters.

26. System for digital transmission of data, point to multipoint over an electricity network, according to claim 22, wherein said correction of errors in frequency is made by resampling the digital signal obtained in the receiver.

27. System for digital transmission of data, point to multipoint over an electricity network, according to claim 22, wherein said head-end and user receivers include the means to extract the cyclic prefix of the OFDM symbols received from the information obtained in the synchronization module, in order to eliminate the interference between symbols in reception produced by echoes in a multipath propagation of an analog signal through the electricity network, and to obtain original OFDM symbols transmitted.

28. System for digital transmission of data, point to multipoint over an electricity network, according to claim 1, wherein said head-end and user MAC include means of informing through the downstream of which user may transmit by the upstream in each time period and which carriers it can use.

29. System for digital transmission of data, point to multipoint over an electricity network, according to claim 1, wherein said user and head-end MAC includes means of inserting a header in the data to be transmitted, indicating from whom and to whom the data is directed and the form in which said data has been coded.

30. System for digital transmission of data, point to multipoint over an electricity network, according to claim 1, wherein said upstream and downstream channels are separated in frequency, time, code or any combination of them.

31. System for digital transmission of data, point to multipoint over an electricity network, according to claim 28 or 29, wherein said information transmitted in the downstream channel is received by all the user receivers, so that these contain means to determine whether the information received should be recovered.

32. Process for digital transmission of data, point to multipoint over an electricity network, that comprises a communication in a downstream channel, determined by a link from a head-end to various different users, and a communication in an upstream channel, determined by a link from each of the users to the head-end, where the communication medium is the electricity network and communication is achieved by an OFDM modulation (orthogonal frequency division multiplexing) to obtain OFDM symbols, where both the head-end and the users transmit/receive with a medium access control (MAC) to provide a master-slave communication, and add/extract a cyclic prefix, in the OFDM symbols and convert the OFDM symbols from a frequency domain to a time domain and from the time domain to the frequency domain, and accomplish digital-to-analog and analog-to-digital conversions; said process for the digital transmission of data comprising the following phases:

adjustment of a transmissible digital data signal and multiplexing of this signal to create transmissible frames, inserting enough redundancy to make correction/detection of errors in reception, interleaving in time to diminish and make easy the correction of errors, measurement of an SNR, dynamically assigning a number of bits per carrier as a function of the result of the measurement of the SNR and a quality required by each user, coding each one carrier of the OFDM modulation with the variable number of bits assigned per carrier, transforming a coded signal from the frequency to the time domain using an inverse fast Fourier transformation (IFFT), adding the cyclic prefix to the time domain signal in to allow recovery of the OFDM symbols from echoes that normally occur in the electricity network and are produced by multipath propagation, translation of a signal obtained in frequency in order to use bands higher than base band and to adjust the transmission to the electricity network and to use spectral superior bands than base band, converting the digital signal to an analog signal and adjusting it in order to send it through the network; wherein the SNR calculation is calculated from a difference of a signal expected and a signal received over a certain time period, and in that the transmission speed is adjusted by comparison of SNR with certain previously fixed thresholds that are a function of different modulation constellations used by the process and a maximum rate of errors allowed at any time, wherein the thresholds previously established contain hysteresis.

33. Process for the digital transmission of data, point to multi-point over an electricity network, according to claim 32, wherein it includes an inverse process that occurs in reception.

\* \* \* \* \*